3,352,686
PROCESS OF MAKING PRECOOKED DEHYDRATED PASTA PRODUCT

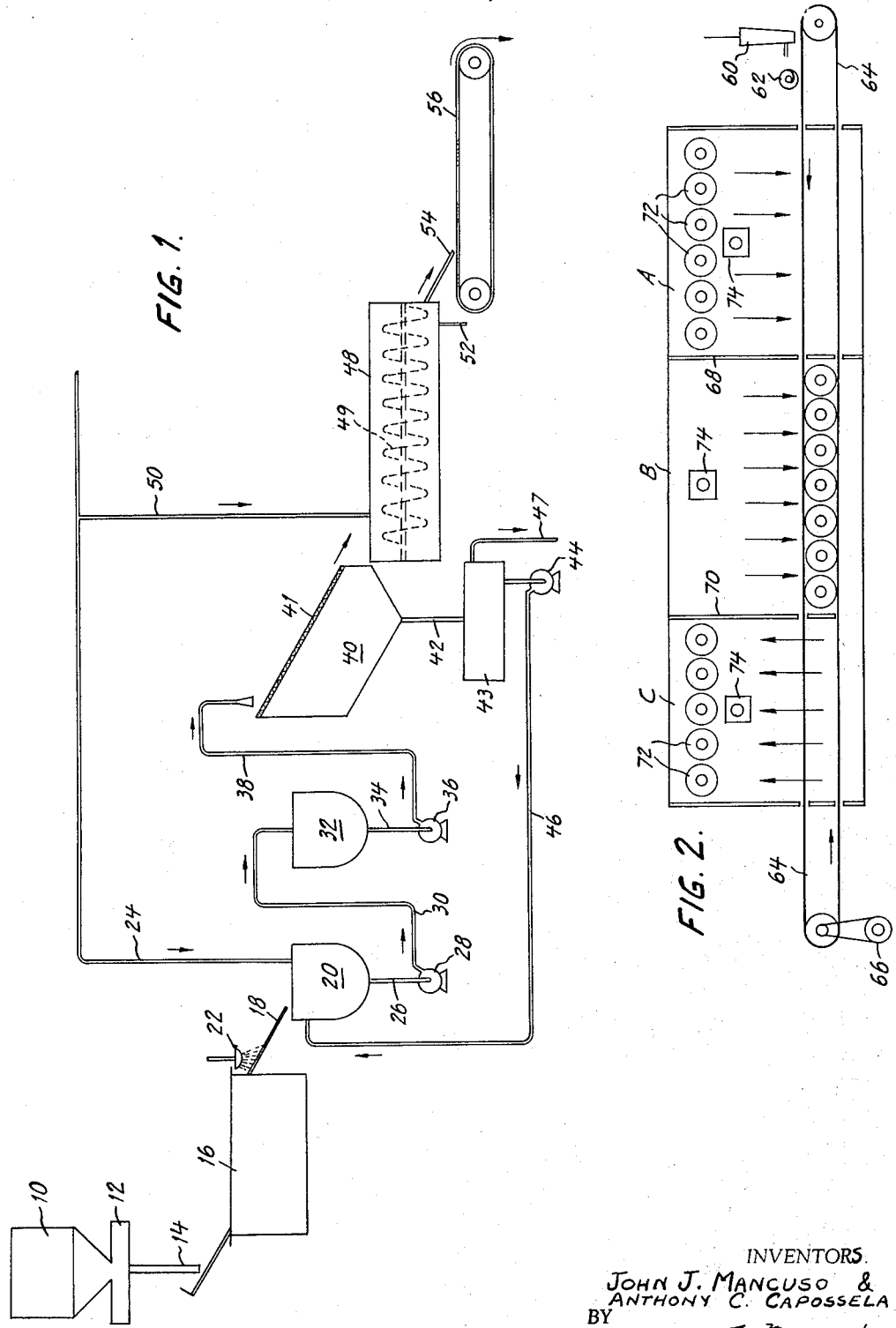

John J. Mancuso, Astoria, and Anthony C. Capossela, North Tarrytown, N.Y., assignors to General Foods Corporation, White Plains, N.Y., a corporation of Delaware
Filed Mar. 30, 1964, Ser. No. 355,770
10 Claims. (Cl. 99—85)

The present invention relates to manufacture of readily hydratable alimentary pasta products such as spaghetti, macaroni and the like.

Conventional dry pasta doughs of commerce are prepared by the consumer for eating by immersing the pasta product in a large excess of boiling water for a period within the range of 6–15 minutes depending upon the desired eating quality and the thickness of the piece. The cooked pasta is then drained of the excess water through a suitable vessel such as a colander and served with butter, sauce or other suitable flavoring, or put into a casserole or other dish for further preparation. In an attempt to offer convenience to the housewife, prior art workers have suggested processes wherein the starch content of the alimentary pasta product is at least partially gelatinized and thereafter dried. Such products generally still call for immersion of the pre-cooked dried product in an excess of boiling water to complete the cooking required for converting the pasta to an edible consistency. Such prior art convenience-type products, so far as is presently known, have not enjoyed any sustained commercial success.

Abortive convenience pastas have been introduced to the market only to be withdrawn for one reason or another. Many of the rehydrated preparations resulting from such convenience products lack the desired firmness and appearance of conventionally prepared pasta. Some products capable of yielding desired firmness are now marketed and offer the convenience of reduced cooking time, but this is achieved merely by making the pasta in a form having a thin wall, i.e., increasing the ratio of the exposed surface to cross-sectional area. However, these products still require immersion in an excess of boiling water followed by draining in a suitable colander or like vessel.

It is a principal object of the present invention to provide a convenience-type dry alimentary pasta product having the overall firmness and appearance of conventional pasta forms cooked in a traditional manner. Another object of the invention is to provide a substantially precooked pasta product with sufficient recipe versatility to permit eating quality to be achieved like that of conventional pasta doughs prepared in a typical manner by rehydration in liquids of varying temperatures ranging from ice water to boiling.

An important object of the present invention is to provide a convenience-type dry pasta product which is also capable of hydrating in just that quantity of moisture required for edibility; thus, the product is to be rehydrated by immersion in just a slight excess of reconstituting liquids thereby eliminating the need for draining excess water. This latter objective has various advantages in the marketing of pasta based or pasta-containing products in dry mixes containing dehydrated vegetables, meats, dairy products and combinations thereof intended for simultaneous hydration with the pasta product and wherein drain-off of rehydrating aqueous liquids cannot be tolerated.

A still more specific object of the present invention is to provide a convenience-type pasta product which is capable of being rehydrated to a cooked, firm, edible consistency simply by immersing the pasta product in boiling water for about five minutes or alternatively immersing the product in just that amount of water required to rehydrate it, bringing the water to a boil and permitting it to simmer four or five minutes as the recipe convenience dictates.

A fundamental processing objective of the present invention is to provide a pre-cooked pasta product which when dried can be readily disassembled or otherwise subdivided into the individual pasta shapes without excessive breaking thereby minimizing the need for rework of broken pieces and the difficulties and expenses incurred in separation of broken pieces from whole pasta forms.

The novel process of the present invention generally calls for water cooking the pasta shape from either a dough or a dry solid state, typically macaroni or any other pasta form, to a cooked condition as by immersion in boiling water or any other cooking means not forming a part of the present invention, quenching the cooked pasta product or otherwise terminating the cook at which point the pasta product should have a moisture content ranging from about 60 to 65% moisture, and thereafter immersing the quenched cooked pasta product in an excess of soak water so as to increase the moisture content to 70–80% whereby the product swells substantially in volume above that which is common for cooked pasta products which are simply colandered.

Typically the cooked pasta product is quenched and subsequently washed free of surface starch by at least one, and preferably a plurality of washings which serve to assure arresting of the cook and removal of free surface starch particles. Thereafter, the quenched and washed pasta form is immersed for a period of at least thirty minutes and usually in the neighborhood of one hour and generally for a period sufficient to provide the swelling that occurs incident to hydration to a 70–80% moisture level or thereabout. This soaking operation should be carried out under conditions whereby the soak water is maintained at a temperature not exceeding 125° F., the duration of the requisite soaking period being inversely related to the temperature of the soak water, and the soak water preferably being at a temperature below 100° F., and greater than 45° F. In this manner, the pasta product is elevated in moisture content into a swollen form whereat it possesses sufficient structural strength to permit its being assembled as in a multi-layered bed which is eventually deposited onto an air circulating hot air dryer belt. By virtue of the condition of the soaked pasta forms, individual articles of pasta will not collapse or otherwise flatten and thereby unduly impede the free circulation of drying air through the bed of product. Most importantly, the dried product issuing from the circulating hot air dryer, can be disassembled readily from the multi-layer bed without adhesion between the spaced points of contact existing between adjacent pasta particles, whereby breakage, fracture or other eccentricities which could give rise to an increase in the proportion of broken or poor-appearing particles is minimized.

Although the processing events of the present invention are described hereinafter by means of a detailed specific operative example wherein the cooked and quenched macaroni form is immersed in a single soaking tank, it is within the ambit and spirit of the present invention that any means such as a plurality of soaking tanks may be employed to progressively elevate the moisture content of the pasta to the aforestated swollen condition and degree of hydration. In all such soaking operations however, the soak water temperature must be maintained below the aforestated level of 125° F., preferably below 100° F. so as to minimize the production of additional solubilized starch material. The avoidance of the production of the solubilized starches on the surface of the soaked pasta products thereby avoids the tendency of the swoolen pasta shapes or forms to adhere incident to the dehydration operation, such that a difficultly separable pasta piece is not encountered.

The cooked, quenched and soaked pasta product of the process is introduced to a dryer under conditions wherein the product is evaporated from the pasta without undue puffing, blistering or other distortions which take place when employing high circulating air temperatures, typically above 212° F. In accordance with the present invention therefore, it is preferred to employ as a circulating hot air medium a drying temperature at least in the terminal stages of dehydration not exceeding 210° F., and preferably a temperature of 200° F. and below, is employed throughout the dehydration operation although higher circulating air temperatures may produce a similarly dry product, that is, one readily disassembled but which is likely to have an undesirable number of the aforesaid blisters or other such distortions.

Thus, the swollen, soaked pasta products are assembled to a multi-layered condition and reduced to a stable moisture content by employing recirculated drying air having a dry bulb temperature preferably not exceeding 210° F. and most preferably in the neighborhood of 180° to 205° F. Lower recirculating air temperatures than those indicated as preferable may be employed with a consequent increase in the requisite drying period. In any event, however, the temperature of the recirculated drying air should exceed 130° F. No control of humidity in the drying air need be observed during drying. The incoming fresh air may have the normal relative humidity of atmospheric air and may be recycled in major proportion without any overt control being employed to adjust the moisture therein. When observing the foregoing preferred air temperature range, the period of dehydration will depend more or less upon the bed depth of the multi-layered dough pieces and the extent to which the drying air is recycled. In general, this period will be in the order of 1-2 hours for a bed having a thickness in the neighborhood of about ¾ to 1½ inches.

It is a feature of the present drying process that the dehydration is carried out under conditions which avoid rapid evaporation of moisture from the cooked dough piece in the pasta bed such as ensues when an elevated temperature well in excess of 200° F. is practiced for the entire dehydration cycle. Higher temperature, i.e., in excess of 210° F. will cause the product to puff incident to the rehydration, the term puffing being understood throughout this specification to refer to the tendency of the pasta to blister or otherwise expand due to the force of the vaporizing water as it is evaporated. Although the initial part of the dehydration cycle may be carried out at elevated temperatures in excess of 210° F., a point will be reached where the puffing will ensue as a result of the continued circulation of air at an unduly elevated temperature. In general, therefore, in the process employed as a preferred embodiment, the recirculation of hot air transpires under conditions which avoid any significant degree of puffing of the product and this is assured when the recirculating air and the product contacted thereby is maintained throughout the dehydration process at a temperature below 210° F. This drying practice assures that drying occurs at a rate whereat moisture is evaporated from the interior of the product at a rate substantially equal to that at which the moisture is removed from its exterior. This means that moisture is removed under conditions whereby the moisture evaporates at a vaporizing plane at a rate which does not exceed the rate at which water vapor can migrate to the surface of the product. By "vaporizing plane" is meant that plane or surface at which moisture is converted from the liquid to the vapor state. It is the point at which drying actually occurs. Initially the vaporizing plane or drying surface is at the surface of the pasta product (during the constant rate drying). Then the vaporizing plane will begin to recede to the interior of the pasta product (during the falling rate stage of drying). As the vaporizing plane recedes into the interior, it becomes necessary for the water which is vaporized to migrate or diffuse to the outer surface of the product before escaping to atmosphere. If moisture is vaporized at a faster rate than it can diffuse to the surface, puffing or blistering of the product will occur. This is undesirable and should be avoided if the appearance, texture and rehydration properties of the precooked pasta are to be preserved during drying.

All of the foregoing stated recipe conveniences and product characteristics are achieved by following the foregoing practices which will be more fully understood by examing the following operative example, which narrative will be more completely understood by reference to the accompanying drawing wherein paragraph FIG. 1 is a schematic drawing of the process steps called for in cooking, quenching, soaking and drying, and FIG. 2 is schematic drawing showing a typical hot air dryer.

*Example*

Referring to FIGURE 1 showing a schematic outline of the method of the present invention as applied to the processing of finished uncooked dry macaroni goods derived from durum wheat flour, the process apparatus will be seen to comprise a tote bin 10 adapted to feed macaroni goods continuously through a vibrator feeder 12 into a chute 14 which discharges to a cooker 16 wherein the macaroni is cooked in water for 7 minutes and from which the cooked macaroni is discharged over flume 18 into quench tank 20 by cold water spray 22 which quenches the macaroni thereby stopping further cooking. Cold fresh water (50° F.) is continuously fed to quench tank 20 through fresh water pipe 24. The quenched cooked macaroni is slurried in tank 20 for a period of one to two minutes and is conducted from the bottom thereof at a temperature approximating that of the cold water fed from pipe 24; as a result of this slurrying, the product is further cooled to insure termination of the cooking operation and picks up a minimal amount of water not usually exceeding 1% depending upon the dwell time of the slurry in tank 20, the quenched macaroni thus suspended in the quench water. The weight ratio of water to macaroni in the quench tank is approximately 10-1. The macaroni slurry is thereafter conducted from quench tank 20 through pipe 26 to slurry pump 28 where it is gently agitated for delivery through pipe 30 and discharged into rewash tank 32 wherein the macaroni slurry is suspended for a period of one to two minutes to await transport through discharge pipe 34 and second slurry pump 36 to pipe 38 from which the washed macaroni goods is discharged to water macaroni separator 40 from which free water drains through a screen 41 to pipe 42 communicating with recycle water reservoir 43. Recycle water from reservoir 43 is recirculated by pump 44 through pipe 46 back to tank 20, a part of the water going to waste through waste pipe 47.

As a result of the gentle agitation that transpires in admixing the quenched macaroni goods in slurry pump 28 and second slurry pump 36, the cooked macaroni picks up a total of approximately 1-2% moisture and expands in volume about 3-6%.

The drained macaroni slides from the screen 41 of drain 40 and discharges into soaker 48 wherein it is conveyed slowly and positively by means of a screw 49 (shown hidden within the soaker) through a length sufficient to provide a residence time of one hour during which period it absorbs in the neighborhood of 3-9% additional moisture to yield a soaked product having a moisture content of 70-75% (wet basis), the final soak moisture level being a function of the degree of cooking, the duration of standing (say 45-75 minutes), and the temperature of the soak water. Fresh water is added to soaker 48 through pipe 50 and is discharged through pipe 52 at a rate such that the average total elapsed time of soak water in the tank is in the neighborhood of 20 minutes. The temperature of the soak water may range anywhere from 35°–120° F.; preferably the water is maintained slightly elevated in temperature, say about 50°–60° F. or higher to promote water absorption with concomitant product expansion. When employing moderately elevated soak temperatures, it will be desirable to maintain a sufficient high rate of water flow throughout the soaker with good mixing action within the soaker to assure that the soak water is highly diluted relative to starch and any mircoorganisms that may be present. In practicing the invention the moisture content of the cooked macaroni or other pasta goods in the soaker will be increased to about 70–80% moisture, preferably to between 70–75% moisture, whereby a collateral increase of 10 to 40% volume occurs in the product as a result of immersion in soaker 48. This will give a total increase in volume of 17 to 60% due to quenching and soaking the product after it leaves water cooker 16.

In the soaker, the moisture content is increased about 5–10% over the moisture content of product issuing from water cooker 16, the product becomes less cohesive when the surface is drained of free water and is generally softer than the cooked macaroni goods issuing from water cooker 16. It may be characterized as a less preferred pasta-type texture at this point in the operation by reason of its softness. The inner and outer diameter as well as the length of the macaroni will have increased commensurate with the volume increase stated above. The soaked product, however, is not as soft as a conventional macaroni of the same dimensions that has been cooked in boiling water to the same moisture level as the soaked product. As distinguished from the soaked product of the present invention, the same macaroni hydrated by boiling in an excess of water to the same moisture level as the level of the soaked product of this invention will not have the same structural strength or ability to retain its shape and will tend to collapse or flatten when placed in a multi-layer bed, such that passage of circulating hot drying air will be impeded; the contact areas between adjacent macaroni will be substantially increased due to the poor structural strength thereof giving rise to difficulty in disassembling a multi-layer bed of dried product without excessive breakage; the product will tend to dry unevenly within the drying conditions contemplated herein and localized wet spots will occur; the rehydrated product will tend to have a poorer appearance, a greater tendency to split and an unfavorable softness; and the yield of processed solids recovered will be dramatically reduced. As distinguished from a cooked macaroni that has merely been cooked, quenched and washed without the concomitant swelling and moisture increase that occurs in soaking to the aforestated moisture level, the soaked product can be assembled into a multi-layered bed which when dried can be disassembled readily without excessive breakage.

After the elapsed soak period called for herein, the product is discharged by means of chute 54 onto a wire mesh belt 56 from which free water is permitted to drain under ambient room temperature conditions for a period of a few seconds. The product removed from the drain belt has the moisture uniformly distributed throughout and in this condition is introduced to the inlet section of the drier depicted schematically in FIGURE 2.

Macaroni is deposited by means of swing spout 60 and double spiral bed leveller 62 onto endless drier belt 64 driven off drive 66 through a multi-stage hot air circulation drier defined by three drying chambers shown as A, B, C and divided from one another by insulated partitions 68 and 70 through which belt 64 passes in delivering product from the inlet to the outlet portions of the drying chambers. Hot air (dry bulb temperature 200° F.) is recirculated by blower means 72 which recirculates the hot drying air under suitable temperature controls shown as 74; the blowers force hot drying air through the bed of product and the foraminous belt 64, most of the drying hot air being recirculated in each chamber with no more than 10% of the drying air being removed through exhaust ducts not shown.

The macaroni is thus distributed so as to give a uniform bed depth across the entire width of the dryer belt; the bed leveller controls the bed depth at from ¾" to 1¼". The macaroni entering the dryer has a bulk density of about 35 lbs. wet macaroni/cu. ft.

The moving dryer belt conveying the macaroni into the first of three drying chambers at 200° F. causes it to be contacted by air circulated through the macaroni bed in a downward fashion at a superficial velocity of about 200–300 ft./min. by means of blowers 72 measured over an empty dryer belt. If temperatures are maintained at the proper level, the water removal will cause the macaroni to begin to shrink from the swelled condition that was attained in the soaker and thereby begin to break any bonds that will have formed between the partially dried, individual macaroni particles. The macaroni remains in this chamber for a period of about 20 minutes during which the moisture content is reduced to about 50% and the bulk density is reduced to about 20–24 lbs./cu. ft. Of the total amount of water to be evaporated, about 65% is removed in this first chamber.

The macaroni then passes into the second drying chamber B where it is again contacted with heated air at about 200° F.; the air circulation direction and velocities are the same as in the first chamber. Product moves through this chamber in about 20 minutes during which time the moisture content is reduced to about 16–20% and the bulk density is reduced to about 16–18 lbs./cu. ft. About 30% of the total water to be evaporated is removed in this section.

The material on the endless belt then passes into the third and final drying chamber C. Heated air at about 200° F. is circulated through the bed in an upward fashion to insure proper drying of the macaroni in contact with the mesh belt. Because of the relatively low moisture content at this point, temperatures must be maintained at such a level that no burning or toasting of the product occurs. The finished product discharges from the dryer belt at a moisture content of from 5–10% and a bulk density of about 14–16 lbs./cu. ft. Proper discharge of the product is assured by using a nylon mesh cover screen over the entire length of the dryer support belt.

No direct control of air humidity in the dryer need be employed. The major portion of the air is recirculated and as stated above about 10% of the air is drawn off by the exhaust blowers.

The product from the dryer passes through a suitable finger breaker to break up any large clumps that may be present and this is accomplished with minimal product practice.

The preparation times for the product of the present process are considerably reduced from the times required to cook conventional macaroni of the same shape; this is due not only to the pre-cooked condition of the product, but also the fact that it can be boiled in just that quantity of water required to rehydrate the product; conventional macaroni requires immersion in a large excess of water, thereby prolonging the time required to bring water to a boil. Typical preparation time for a macaroni product (including the time required to bring the cook water to a boil) for equal servings of the product of the present process and a conventional macaroni of a conventional shape, are in the order of 10 minutes and 20–30 minutes, respectively.

As distinguished from conventional macaroni products destined for use in casserole dishes and other such dishes prepared in the oven, which macaroni products generally have to be partially cooked on stove top before addition to the casserole ingredients, the product of the present process can be added to the ingredients and cooked simultaneously therewith in the oven.

By virtue of the rehydratability of the product, no pour-off is required, as distinguished from the conventional macaroni and other pasta goods cooked in the boiling water and calling for a draining and washing operation. By eliminating pour-off from the recipe, the present product can be rehydrated in flavoring materials per se, such as soups and broths, thereby avoiding a multiplicity of recipe steps for cooking and then combining the flavoring materials.

By reason of the unique swelling step employed prior to dehydration and after cooking, the rehydrated product of the present invention has less solids on a volumetric serving basis than conventional macaroni and therefore has less calories per serving. By reason of the sequence of processing steps employed in the present process, a greater hydration level of fully cooked product is achieved without, at the same time, sacrificing product texture and undue loss in solids to achieve this texture.

Finally, the product of the invention can be rehydrated in both cold and hot water for a multiplicity of recipe requirements ranging from a cold macaroni salad to a conventional hot preparation which may or may not have directly therein included flavoring ingredients referred to above.

Process-wise, all of the foregoing product advantages are achieved without incurring solids loss incident to handling of the product either during cooking, sequential washings, subsequent soaking or final dehydration. In this latter step the handleability of the macaroni goods during processing is such that they can be readily assembled into a multi-bed condition and thereafter dried from this condition without undue adhesion existing between the spaced points of contact of the individual pasta particle, whereby those particles can be separated with only negligible breakage.

The effect of air drying temperatures on product rehydration characteristics is demonstrated by the accompanying table wherein product of the process described in the example was evaluated and the variable was the dry bulb temperature employed in the dehydration operation, this temperature being practiced throughout each drying cycle until the stable moisture level of less than 10% was obtained.

puffing in the dry product being less than aesthetic and not reminiscent of traditional pasta products.

It will be noted that at lower drying temperatures the texture of the product (as indicated by the 3 plus symbols on the chart) is preferred, the structural strength of the product being higher than in the case where the product is dried at temperatures above 250° F. (represented by only 2 or 1 plus symbols) wherein the product texture is progressively reduced giving rise to an inferior eating quality.

While this invention has been described by reference to a specific example, it is to be restricted only by the scope of the following claims.

What is claimed is:

1. The process of making a pre-cooked dehydrated pasta product which comprises water cooking a pasta shape to a cooked condition by immersion in boiling water, quenching the cooked pasta product to terminate the cooking step, thereafter immersing the quenched cooked pasta having a moisture content of about 60–65% in an excess of soak water at a temperature of from about 35° to 125° F. for a period of time sufficient so as to increase the moisture content thereof to 70–80% and swell the product substantially in volume, and dehydrating the soaked swollen pasta product by circulation of hot drying air at a temperature not exceeding 210° F. and at a rate whereat moisture is evaporated from the interior of the product at a rate substantially equal to that from which the moisture is removed from its exterior, whereby the product is dried in a substantially unpuffed condition.

2. The process of claim 1 wherein the quenched pasta product is soaked for a period of 45–75 minutes at a soak water temperature ranging from 35°–120° F., the duration of the soaking operation varying inversely as the temperature of the soaked water.

3. The process of claim 2 wherein the soak water is maintained at a slightly elevated temperature in the neighborhood of 50–65° F.

4. The process of claim 1 wherein the cooked pasta is quenched and washed free of surface starch in at least one washing operation prior to soaking.

5. The process of claim 4 wherein the quenched pasta is admixed in the form of a slurry in cold wash water preparatory to soaking.

TABLE.—MACARONI—EFFECT OF DRYING TEMPERATURE

|  | Drying Temperature (° F.) | | | | |
| --- | --- | --- | --- | --- | --- |
|  | 190 | 225 | 250 | 300 | 320 |
| Dry Volume (cc./5 oz. product) | 660 | 690 | 725 | 850 | 875 |
| Bulk Density (gm./cc.) | 0.215 | 0.206 | 0.196 | 0.167 | 0.162 |
| Wet Weight (gm.) | 469 | 480 | 515 | 565 | 565 |
| Wet Volume (Cups) | 4 | 4 | 4+ | 4¾ | 5+ |
| Pour-Off (cc.) | 110 | 104 | 95 | 52 | 18 |
| Texture | +++ | +++ | ++ | ++ | + |
| Percent Floaters (Zerotime) | 4 | 57 | 90 | 100 | 100 |

It will be noted from the foregoing table, that by employing a drying temperature below 225° F. the percentage of floaters (product having an apparent density less than that of water upon initially being wetted by water brought to a boil) is considerably reduced whereas at elevated drying temperatures of 225° F. and above the percent floaters were significantly increased as drying temperature increased. It should be appreciated, however, that all of these products rehydrate satisfactorily and ultimately submerge during a hot recipe preparation calling for a total cooking to a boil of ten minutes, time being measured with the first introduction of cold water to a flame and final removal of cooked product therefrom. The desirability of eliminating floaters as much as possible is accompanied by the avoidance of the high incidence of puffing which occurs as the drying temperature increases, 6. The process of claim 1 wherein the residence time in the soak water and the temperature of the soak water are sufficient to cause the quenched pasta to absorb between 5–10% additional moisture, the duration of the soaking operation being at least 45 minutes and sufficient to cause an increase in swelling of 10–40% over its volume in a quenched condition.

7. The process of claim 6 wherein the soaked pasta product is dried to a stable moisture content of less than 10%.

8. The process of claim 6 wherein the product is dried by removal of the majority of the moisture in a circulating air temperature of less than 210° F.

9. The process of claim 8 wherein the soaked pasta product is assembled into a multi-layered bed having at least one layer of a plurality of pasta products which overlie a second layer and contact that second layer at spaced points of contact throughout the bed.

10. The process of claim 9 wherein the pasta product is assembled into a uniform bed depth in the neighborhood of 3/4–1 1/4" and the product is dried by means of circulating hot air at a dry bulb temperature of 200° F. at a superficial velocity of 200–300 feet per minute measured over an empty drier belt.

References Cited

UNITED STATES PATENTS

| | | | |
|---|---|---|---|
| 2,552,120 | 5/1951 | Scotland | 99—85 X |
| 3,192,049 | 6/1965 | Kinsley | 99—85 |

RAYMOND N. JONES, *Primary Examiner.*

A. LOUIS MONACELL, *Examiner.*